US007234073B1

(12) United States Patent
Roytman et al.

(10) Patent No.: US 7,234,073 B1
(45) Date of Patent: Jun. 19, 2007

(54) SYSTEM AND METHODS FOR FAILOVER MANAGEMENT OF MANAGEABLE ENTITY AGENTS

(75) Inventors: Evgeny Roytman, Sharon, MA (US); John P. Sheehy, Jr., Braintree, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 541 days.

(21) Appl. No.: 10/675,423

(22) Filed: Sep. 30, 2003

(51) Int. Cl.
*G06F 11/00* (2006.01)
(52) U.S. Cl. .......................................................... 714/4
(58) Field of Classification Search ...................... 714/4
See application file for complete search history.

(56) References Cited

U.S. PATENT DOCUMENTS

| | | | |
|---|---|---|---|
| 6,493,695 B1* | 12/2002 | Pickering et al. ............. | 706/47 |
| 6,763,104 B1* | 7/2004 | Judkins et al. ......... | 379/265.09 |
| 6,839,746 B1* | 1/2005 | Muthiyan et al. ........... | 709/220 |
| 7,003,687 B2* | 2/2006 | Matsunami et al. ............ | 714/4 |
| 7,039,707 B2* | 5/2006 | Hiraiwa et al. .............. | 709/226 |
| 2001/0047482 A1* | 11/2001 | Harris et al. ................. | 713/200 |
| 2002/0026558 A1* | 2/2002 | Reuter et al. ................ | 711/114 |
| 2002/0067822 A1* | 6/2002 | Cohen et al. .......... | 379/265.12 |
| 2003/0065760 A1* | 4/2003 | Casper et al. ................ | 709/223 |
| 2003/0172331 A1* | 9/2003 | Cherian et al. .............. | 714/712 |
| 2004/0024573 A1* | 2/2004 | Allen et al. .................. | 702/189 |
| 2004/0028213 A1* | 2/2004 | Goss ...................... | 379/265.09 |
| 2004/0193969 A1* | 9/2004 | Nemoto et al. .............. | 714/100 |
| 2004/0213400 A1* | 10/2004 | Golitsin et al. ......... | 379/265.12 |
| 2004/0215904 A1* | 10/2004 | Gopisetty et al. ........... | 711/153 |
| 2005/0015685 A1* | 1/2005 | Yamamoto ................... | 714/54 |
| 2006/0036899 A1* | 2/2006 | Nemoto et al. ................ | 714/5 |

* cited by examiner

*Primary Examiner*—Robert Beausoliel
*Assistant Examiner*—Amine Riad
(74) *Attorney, Agent, or Firm*—Chapin IP Law, LLC; Barry W. Chapin, Esq.

(57) ABSTRACT

In a managed information network, unavailable agents have a detrimental effect on user access to manageable entities. Intelligent, optimal assignment of manageable entities to available agents becomes a formidable task, particularly in a large storage area network. The task becomes especially complex when there are deployed agents of different types capable to manage a different scope of functionality of managed elements of the same type. A failover processor provides reliable, rule based methods for initial assignment of manageable entities (elements) to best available management agents, and a reliable, dynamic, rule based mechanism to reallocate manageable entities to a best management agent in case when current agent, responsible for element management, become unavailable or new best agent for element management starts up. A prioritized list of failover rules specifies metrics for determining alternate agents for manageable entities in the event agents become unavailable. A failover chain, or list of agent types, identifies preferential agent types to which the reassigned manageable entities correspond. Successive prioritization rules apply in the event that multiple candidate agents of the failover chain selection are available.

22 Claims, 10 Drawing Sheets

34  FAILOVER RULES

| PRECEDENCE | RULE |
|---|---|
| 1 | FAILOVER CHAINS |
| 2 | HIGHEST AGENT VERSION |
| 3 | BEST LOGICAL NETWORK DISTANCE |
| 4 | LOWEST MANAGEMENT LOAD |

30  COMPATIBLE ASSOCIATION TABLE

| AGENT TYPE | CAN MANAGE ENTITY TYPE |
|---|---|
| AT1 | MET1 |
| AT2 | MET2 |
| ATH | MET1 |
| ATH | MET2 |

ATH: AT1; AT2; ATH|
AT1: AT1; ATH|
AT2: AT2; ATH|

36  AGENT CONFIGURATION TABLE

| AGENT | TYPE | VERSION | LOAD | AVAIL |
|---|---|---|---|---|
| 16-11 | AT1 | 1.3 | 1 => 0 | A => U |
| 16-12 | AT2 | 2.0 | 0 | A |
| 16-13 | AT2 | 2.0 | 1 | A |
| 16-14 | ATH | 3.1 | 2 | A |
| 16-15 | ATH | 3.1 | 1 | A |
| 16-16 | ATH | 3.1 | 0 | A |

SYSTEM AND METHODS FOR FAILOVER MANAGEMENT OF MANAGEABLE ENTITY AGENTS

BACKGROUND OF THE INVENTION

In a conventional managed information system, such as a storage area network (SAN) operable to coordinate access to mass storage devices by a set of users, the network (SAN) interconnects a plurality of storage device nodes and associated interconnection nodes. The storage area network includes a variety of nodes for providing mass storage retrieval services to users, such as storage devices (e.g. disc drive arrays), connectivity devices (e.g. switches and routers), and conventional host computers for executing user applications and software components called agents for monitoring and controlling the nodes in the storage area network. The resultant infrastructure, therefore, for monitoring and controlling the storage area network, defines a complex array of nodes and interconnections.

A storage area network generally has many manageable entities of various types. Conventional storage area networks allocate a particular agent to one or more manageable entities based on matching, or corresponding types. Therefore, the system deploys many agents to correspond to the number and types of manageable entities in the storage area network. In a particular exemplary implementation, the nodes include manageable entities responsive to the SAN management application and include storage entities, connectivity entities, and database entities. The result is a complex set of interrelations between the agents and the corresponding manageable entities.

In such a storage area network, inefficient allocation or failure of the agents affects user ability to monitor and manage the manageable entities. Since the agents direct the operation of a set of manageable entities, a manageable entity, such as a disk storage array, may not be readily accessible to the user or operator of the manageable entities if timely input from the managing agent is not available, leading to user dissatisfaction and possibly to excessive deployment of additional resources.

SUMMARY

In a conventional managed information system, agents or other management components are typically initially deployed accordingly to a balancing or workload metric, and codified in startup files or message scripts, for example. An operator or system administrator reassigns or restarts the agents by manual operator intervention to adjust or alter the workload among the available agents.

Further, ongoing system tuning and maintenance suggests periodic or consistent balancing of manageable entities, or objects, across the available agents. Dynamic changes in system throughput demands, as well as configuration changes such as the number of agents and/or manageable entities, tend to imbalance a tuned system, create potential bottlenecks and contribute to agent load imbalance and unavailability.

Circumstance may arise, therefore, which render an agent temporarily unavailable. Such circumstances include network connection failure (i.e. pulled cable), power failure, and component errors, such as buffer overflow, latency timeouts, and others. Agent unavailability, particularly unexpected termination, may impede user access for monitoring and managing the corresponding manageable entities until remedial actions are taken, such as reallocating the manageable entities to an alternate agent.

However, as indicated above, the mapping of agents to manageable entities depends upon compatibility associations between the manageable entity types and the agent types. Also, certain hybrid agents are operable to manage multiple entity types. Further, there may be multiple compatible agents operable to offload manageable entities from an unavailable agent. Accordingly, manual intervention to determine and map the complex associations between available agents and manageable entities may be unwieldy and cumbersome. An automated mechanism to detect agent unavailability and dynamically failover affected manageable entities to alternate managing agents avoids cumbersome manual detection and reallocation for agents which are overloaded or unavailable.

Embodiments of the invention are based in part on the observation that failed or overloaded agents have a detrimental effect on the ability of the user to monitor and manage the throughput and operation of the manageable entities. Assignment of manageable entities to available agents becomes a formidable task, particularly in a large storage area network. Conventional storage area networks may have a static allocation of agents, such as via a startup file. Such a static definition, however, is not adaptive to additions and deletions of SAN nodes. Further, a static definition may incorporate manual intervention to restart a failed agent. Accordingly, it would be beneficial to define a mechanism to monitor the status of deployed, active agents, receive feedback indicative of current performance and operating status, determine compatible alternate agents from among the available agents by using the compatibility associations, and when reassignment attempts result in a plurality of available candidate agents, applying priority rules to compute an optimal agent assignment.

The present invention substantially overcomes particular shortcomings of the above described conventional methods of agent management. A prioritized list of failover rules specifies metrics for determining alternate agents for manageable entities in the event that a new manageable entity is discovered (configured) of if the current managing agent for a particular manageable entity becomes unavailable. A failover chain, or list of agent types, identifies preferential agent types to which the reassigned manageable entities correspond. Successive prioritization rules apply in the event that multiple candidate agents of the failover chain selection are available. The management application selects candidate agents with the most current, or highest, software version first, followed by agents having the best logical distance to the manageable entity. Logical distance includes several network behavioral characteristics indicative of relevant agent management proximity to the manageable entity. A load balancing metric applies if multiple candidate agents remain.

In further detail, the method for allocating and reallocating management responsibility of manageable entities to agents in a managed information network as disclosed herein includes detecting a manageable entity requiring assignment or reassignment of an agent, and identifying a manageable entity type of the manageable entity requiring reassignment of management responsibility. The management application identifies a set of deployed agents in the managed information network, in which each of the agents has an agent type and is operable to manage a particular compatible manageable entity type. Failover rules employ the type of the manageable entity, the agent type of the managing agent and the compatibility associations to determine a primary agent from among the identified set of deployed agents for managing the manageable entity. The management server then informs the particular primary agent of the responsibility for managing the manageable entity from the result of the failover rules.

Definition of the failover rules for designating the failover agents types operable to manage the manageable entities corresponding to the agent type further examines the compatibility associations between the manageable entity types and the agent types. The failover rules identify each agent type for which a failover applies, and for each identified agent type, define an ordered failover chain of agent types compatible to manage the manageable entities corresponding to the agent type. The resulting ordered failover chain is indicative of a priority of agent types, and determines compatibility according to the compatibility associations.

Failover rule definition further includes defining an ordered set of rules following a precedence. The precedence order priority includes: 1) failover chain, 2) highest agent version, 3) best logical distance to manageable object, and 4) lowest management load. At each rule according to the precedence, if a rule results in multiple compatible agents operable to manage the manageable entities, the management application applies the next rule in the precedence. Alternate configurations may define other or additional precedence rules depending on the deployment requirements.

Determination of the best logical distance includes determining logical characteristics including at least one of network hops, network proximity, discovered access data parameters, remote data facility connections, and local/remote status to compute the logical distance metric for a particular candidate agent.

In a particular configuration, applying the failover chain includes identifying manageable entities for allocation or reallocation, and scanning the failover chains to determine a failover chain owned by a matching agent type. The management application parses the failover chain to compute the next agent type in the failover chain, and determines available candidate agents to receive management responsibility for the manageable entities according to the agent type. Application of the failover rules may result in determining a plurality of candidate available agents. Accordingly, the management application iteratively applies the failover rules until a deterministic agent for assigning management responsibility is found The management application maintains and monitors the health of the agents, and identifies a manageable entity operable for assignment or reassignment by monitoring the status of existing agents. Such agent status provides for detecting emergence of a new agent, detecting emergence of a new manageable entity, detecting failure of an existing agent, detecting unavailability of an existing agent, detecting recovery of an existing agent and detecting availability of an existing agent.

In the event agent are reassigned from a current agent to an alternate managing agent, the management application transmits a primary designation message to the determined primary agent to indicate management responsibility for the identified manageable entity, and transmits an indication of the former managing entity as no longer having management responsibility for the particular manageable entity.

Alternate configurations include compatibility associations incorporating a hybrid agent type operable to manage manageable entities of a plurality of manageable entity types. Accordingly, the compatibility associations encompass agent types corresponding to particular manageable entity types, and include a dedicated agent type operable to manage a particular type of manageable entity, hybrid agent types operable to manage a plurality of manageable entity types, common interface agent types operable to manage a manageable entity conversant in a common information model and lightweight agent types to manage manageable entities for a subset of available manageable entity operations, such as, for example, database and file system operations.

The invention as disclosed above is described as implemented on a computer having a processor, memory, and interface operable for performing the steps and methods for monitoring an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention are based in part on the observation that failed or overloaded agents have a detrimental effect on the ability of the user to monitor and manage the throughput and operation of the manageable entities (objects) in the SAN. Assignment of manageable entities to available agents becomes a formidable task, particularly in a large storage area network. Conventional storage area networks may have a static allocation of agents, such as via a startup file. Such a static definition, however, may not be adaptive to additions and deletions of SAN nodes or to addition, deletion, and failure of agents. Further, a static definition may incorporate manual intervention to restart a failed agent. Accordingly, disclosed below is a mechanism to monitor the status of deployed, active agents, receive feedback indicative of current performance and operating status, determine compatible alternate agents from among the available agents by using the compatibility associations, and when reassignment attempts result in a plurality of available candidate agents, applying priority rules to compute an optimal agent assignment.

The present invention substantially overcomes particular shortcomings of the above described conventional methods of agent management. A prioritized list of failover rules specifies metrics for determining alternate agents for manageable entities in the event the current managing agent becomes unavailable. A failover chain, or list of agent types, identifies preferential agent types to which the reassigned manageable entities correspond. Successive prioritization rules apply in the event that multiple candidate agents resulting from the failover chain selection are available. The management application selects candidate agents with the most current, or highest, software version first, followed by agents having the best logical distance to the manageable entity. Logical distance includes several network behavioral characteristics indicative of management proximity to the manageable entity. A load balancing metric applies if multiple candidate agents remain.

Figure 1:
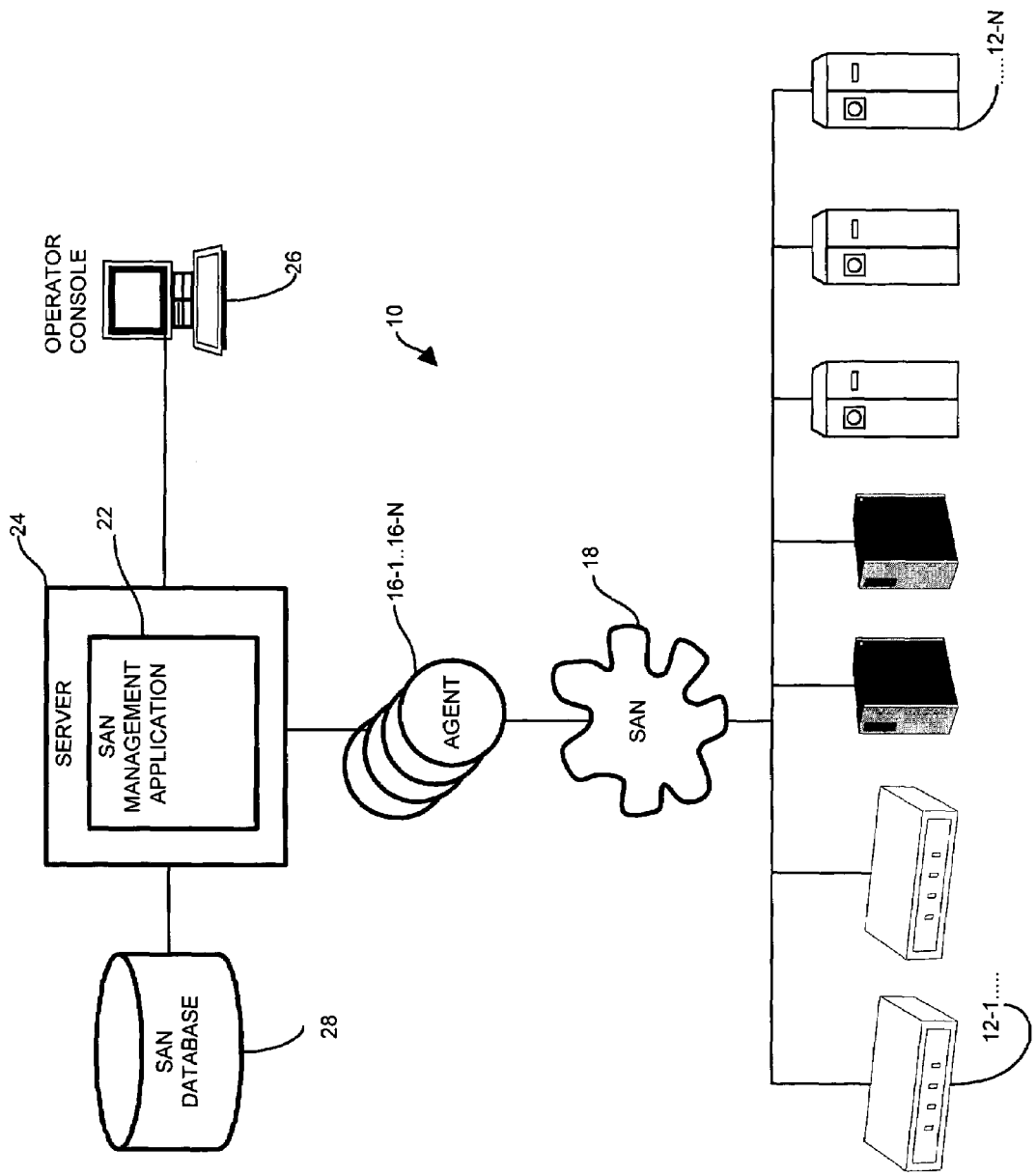
FIG. 1 is a context diagram for managing agents in a managed information network such as a storage area network.

FIG. 1 is a context diagram for managing agents in a managed information network such as a storage area network 10. Referring to FIG. 1, a storage area network 10 includes a plurality of manageable entities 12-1 . . . 12-N. The manageable entities include storage device entities such as disc drive arrays, connectivity entities such as routers and switches, and component entities such as software and hardware processes or executable objects. The manageable entities 12-1 . . . 12-N (12 generally) connect to a SAN interconnection 18, or wire, which also connects to a server 24 including a storage area network (SAN) management application 22. The SAN management application 22 is responsive to an operator console 26 for receiving user/operator input and control, and employs a database 28 of management information concerning the manageable entities 12 and agents 16 in the storage area network 10.

The SAN interconnection 18 is an aggregation of physical network interconnections which provide wire layer services between the nodes (e.g. manageable entities and agents) of the SAN. The interconnection 18, therefore, denotes a logical connectivity between the SAN nodes, rather than illustrating the physical connections. Such physical connections include a variety of transport mechanisms, such as TCP/IP, Ethernet, and others, including proprietary mechanisms discussed further below.

Each of the manageable entities 12 in the storage area network 10 is managed by a particular agent 16. The management application 22 assigns the agents 16-1 . . . 16-N for managing the manageable entities 12. Each agent 16 is operable to manage one or more of the manageable entities 12, and responsive to the management application 22 for management responsibility as discussed further below.

Figure 2:
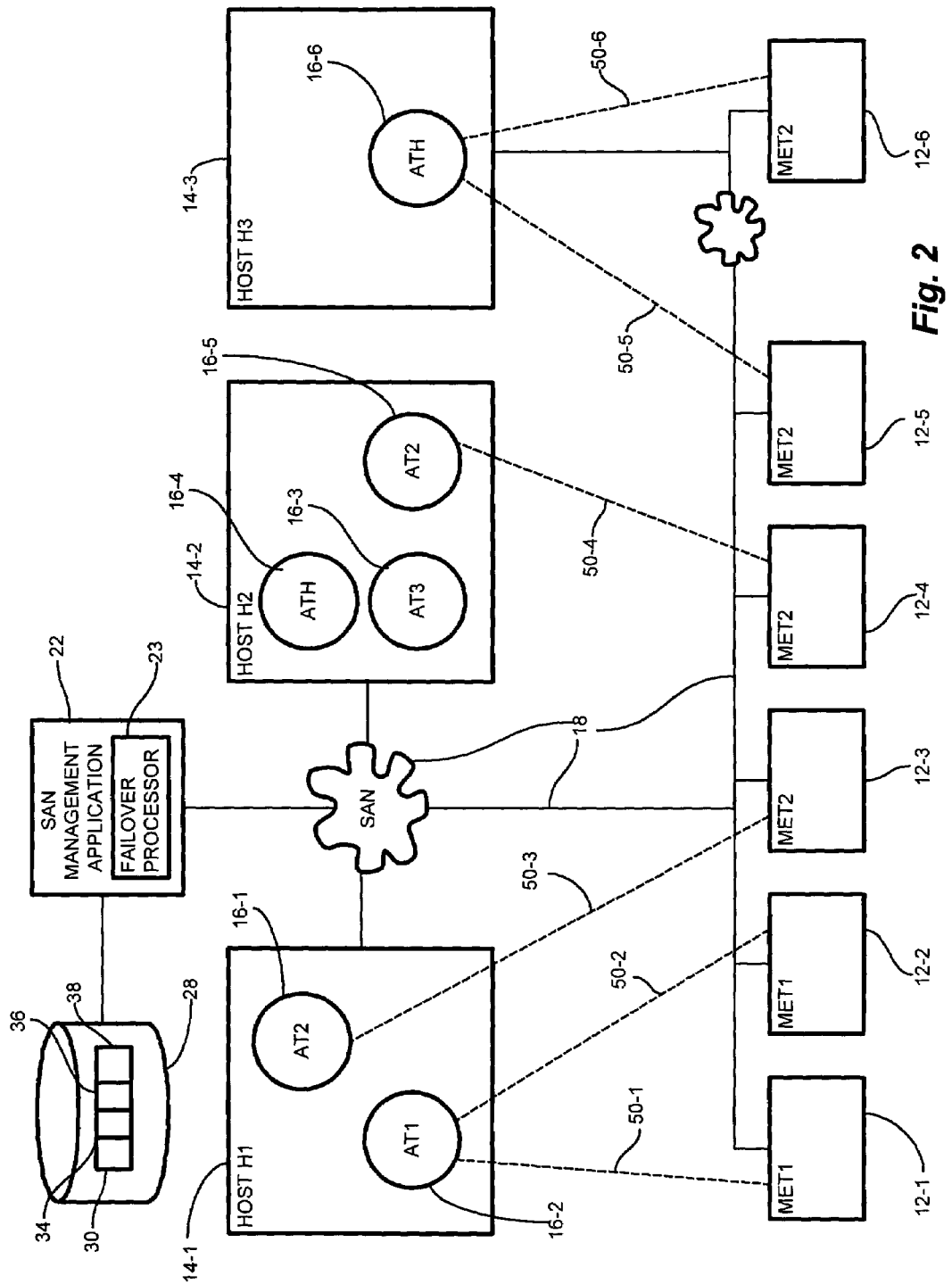
FIG. 2 is a block diagram of a computer system suitable for use with a particular configuration of the invention as defined herein.

FIG. 2 is a block diagram of a computer system suitable for use with a particular configuration of the invention as defined herein. Referring to FIGS. 1 and 2, management responsibility for particular manageable entities 12 is shown by the dotted lines 50-1 . . . 50-6 (50 generally). It should be noted that, as alluded above, the particular wire layer interconnections for network switching and physical connectivity are handled by the infrastructure provided by the SAN interconnection 18. The management application 22 includes a failover processor 23 for computing and assigning management responsibility in the event of agent 16 unavailability, as discussed further below. Accordingly, each of the manageable entities 12 is operable for communication with one or more of the agents 16.

The management application 22 is also in communication with the SAN database 28. The database 28 is responsive to the failover processor 23, and includes a compatibility association table 30, a table of failover chains 32, failover rules 34, and an agent configuration table 38, all discussed further below.

Each of the manageable entities is of a particular type, distinguished first by entity class, i.e. storage device, connectivity device, and executable component. The manageable entities 12 are further distinguishable by types within the entity class. For example, in the storage device entity class, there are multiple entity types of storage device disk arrays, each with different capacity and access speed characteristics. Such types include, for example, Symmetrix®, Clariion®, and Celera® storage arrays, marketed commercially by EMC corporation of Hopkinton, Mass., assignee of the present application. Each of the agents 16 also has a particular agent type. A particular manageable entity 12 is manageable by a certain type or types of agents 16. A series of compatibility associations 35, defined further below, defines agent 16 compatibility for managing manageable entities 12.

Generally, agents 16 may manage manageable entities of the same type, that is, for example, a Symmetrix agent 16 may mange a Symmetrix device. However, certain agents 16, called mapper or hybrid agents, may manage multiple types of manageable entities 12. Further, compatible agents 16 may not have the same management capability over a manageable entity 12. For example, a mapper agent 16 may manage only file systems and databases for a manageable entity 12, and does not have management capability over other functions of the manageable entity 12.

Figure 3:
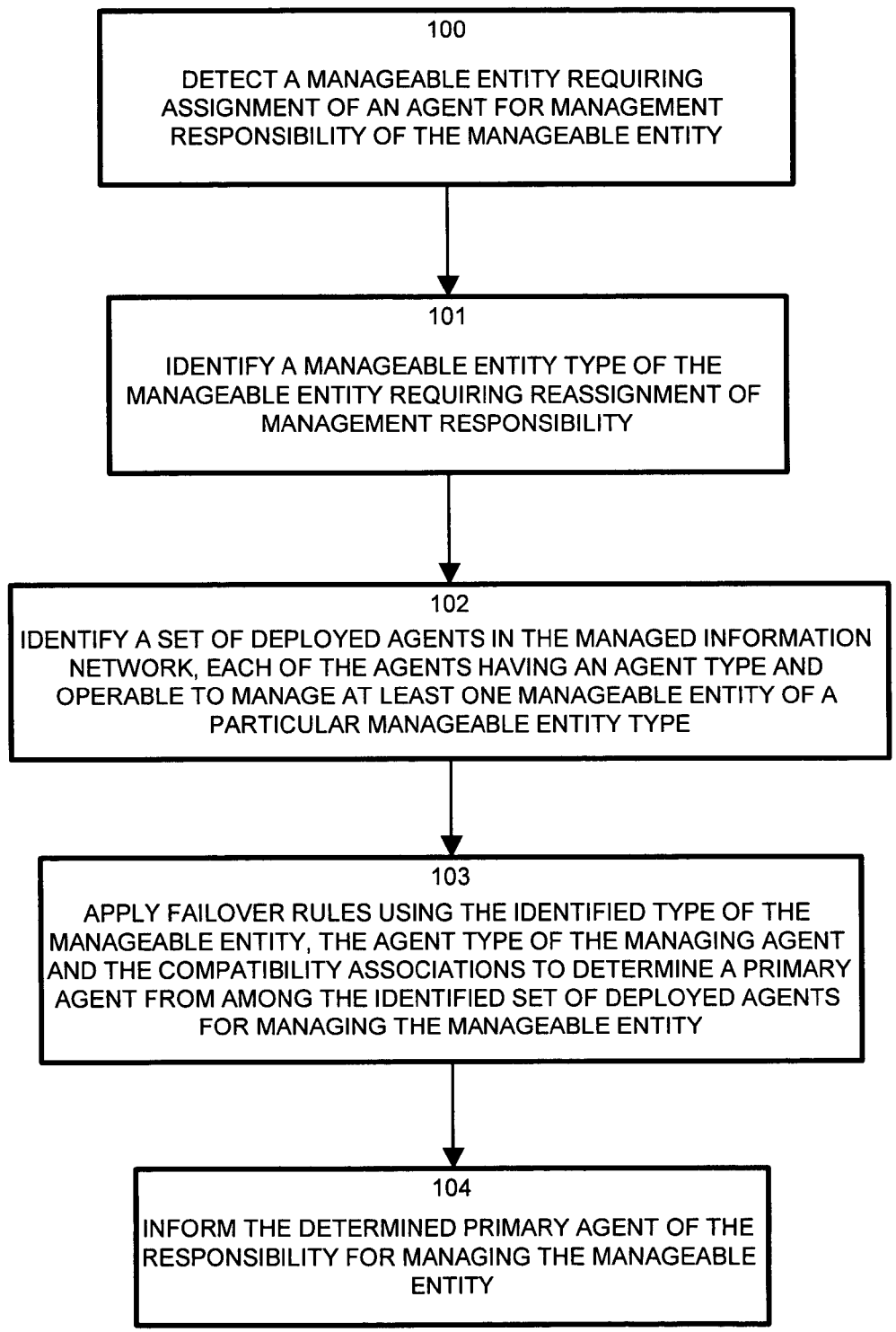
FIG. 3 is a flowchart showing failover management of manageable entity agents as defined herein.

FIG. 3 is a flowchart showing failover management of manageable entity agents 16 as defined herein. Referring to FIG. 3, at step 100, the failover processor 23 detects a manageable entity requiring assignment of an agent for management responsibility of the manageable entity. The failover processor 23, along with the management application 22 continually monitors the various manageable entities 12 in the SAN by various monitoring mechanisms, which are suited to the type of manageable entity i.e. disk array or connectivity device, for example. In particular implementations, the monitoring occurs as a message, or "ping," to a manageable entity 12. The management application expects a response to a ping, and determines availability by receipt of the response. If there is no response, the manageable entity is deemed unavailable. Other monitoring mechanisms may also be employed, such as an interrupt driven or alert driven notification.

Figures 4, 5, 11, 12:
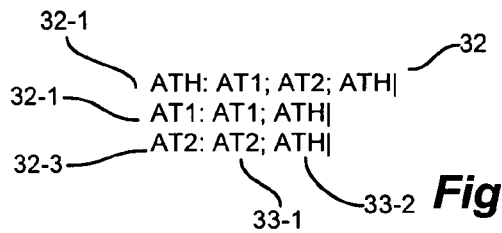
FIG. 4 is a table of failover rules indicating precedence of the assignment rules.
FIG. 5 is a compatibility association table indicating management associations between the manageable entities and agents.
FIG. 11 is a table illustrating failover rules.
FIG. 12 is a set of failover chains.
Figure 6:
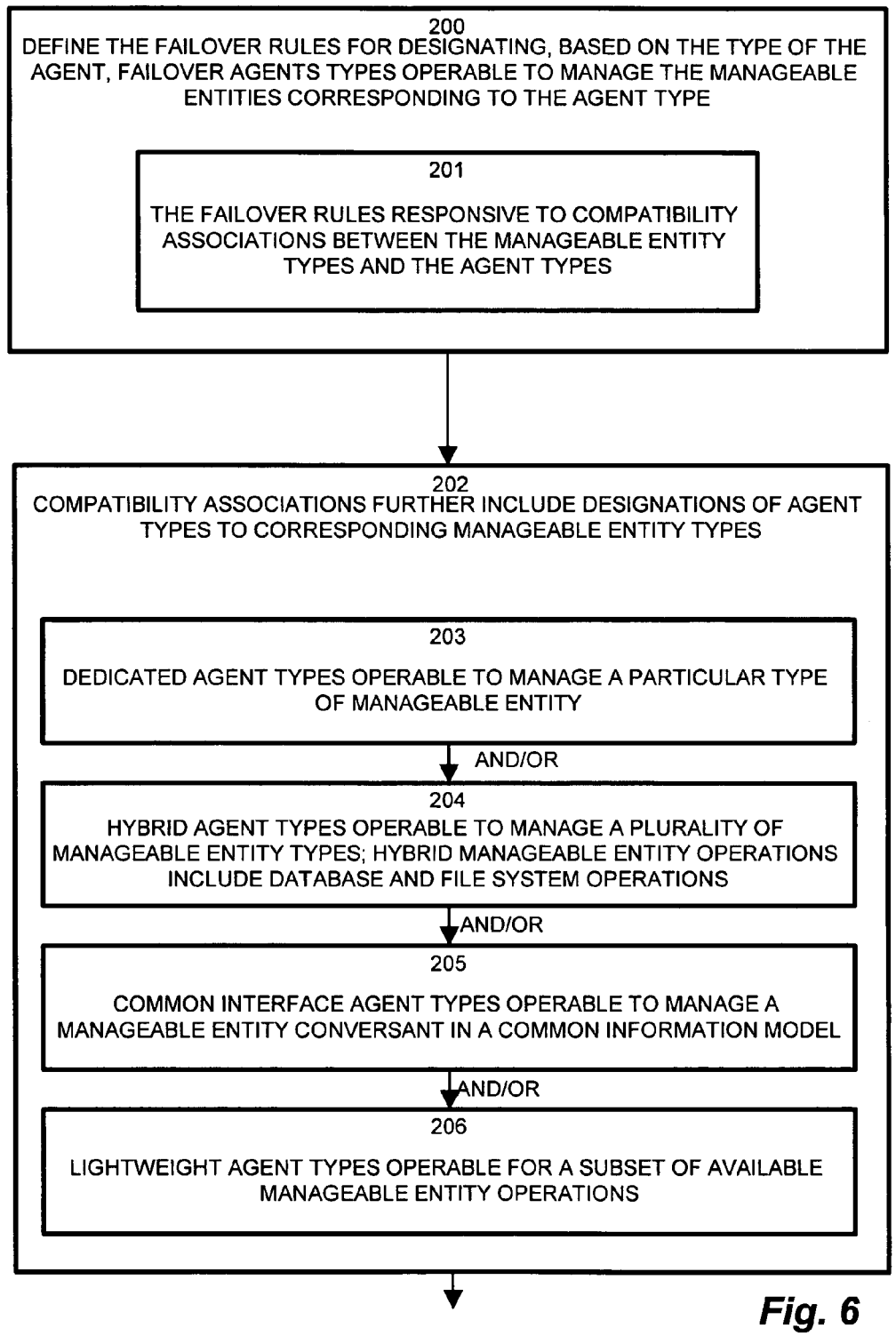
FIGS. 6–10 are a flowchart showing failover management as in FIG. 2 in greater detail.
Figure 7:
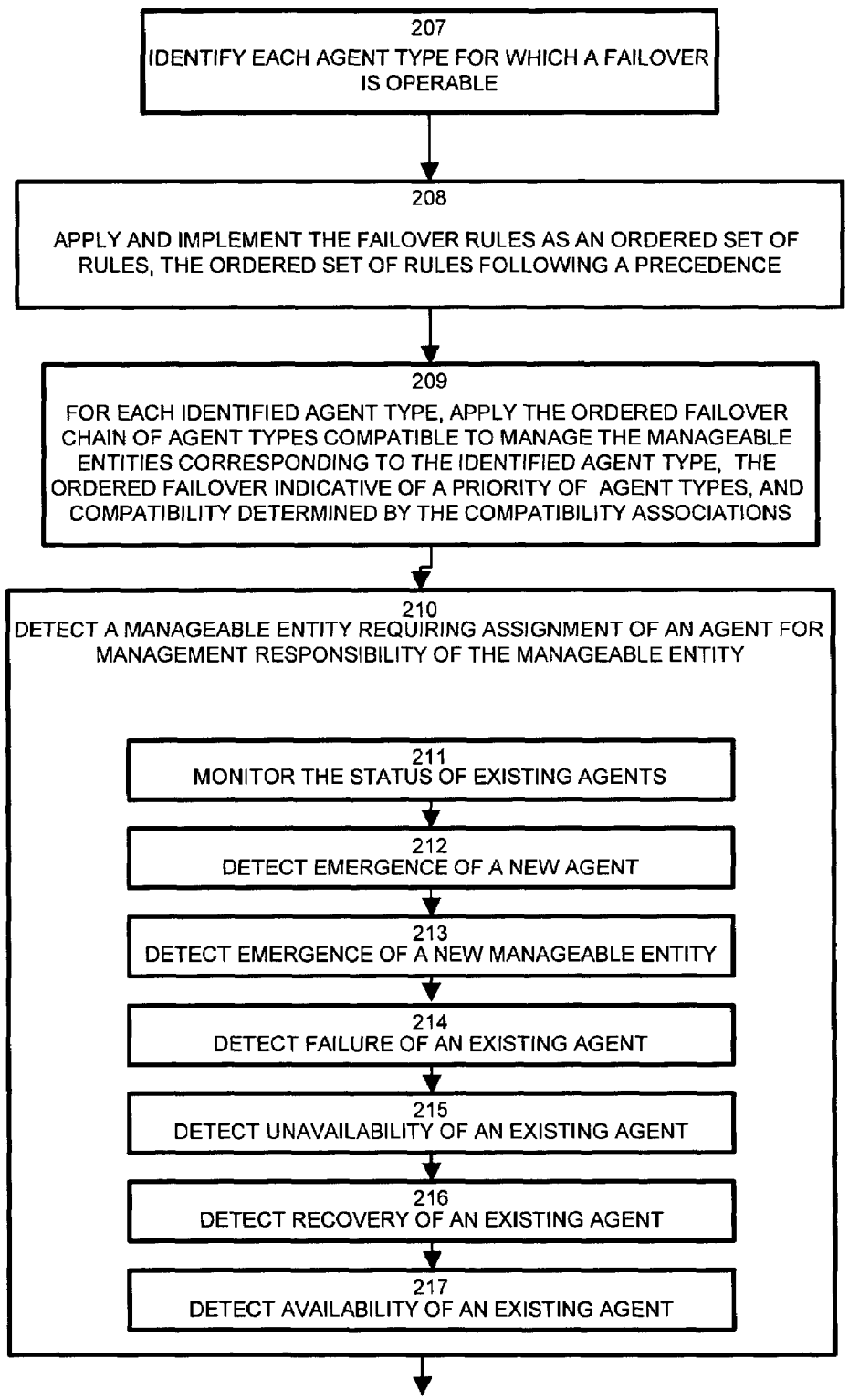
Figure 8:
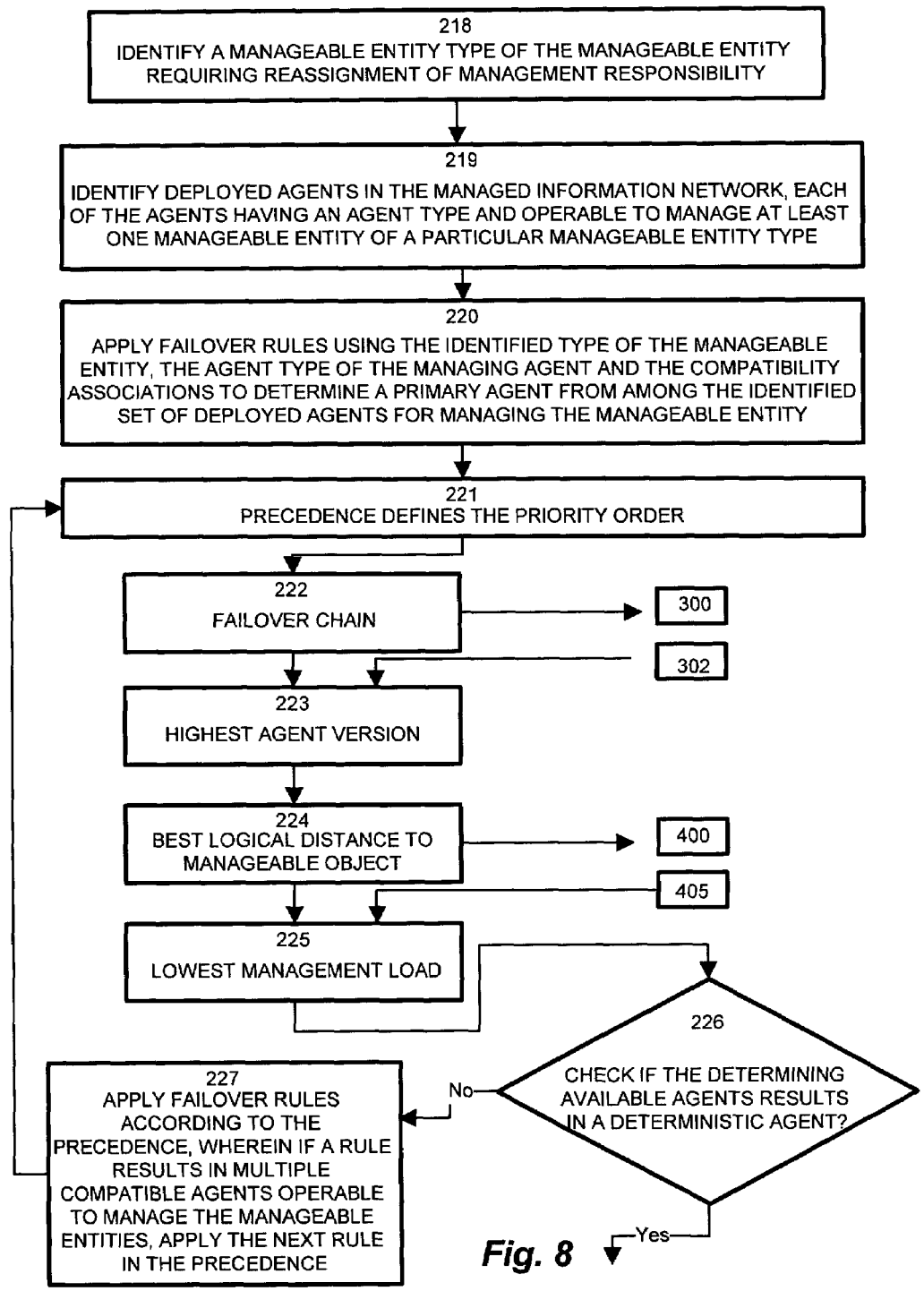
Figure 9:
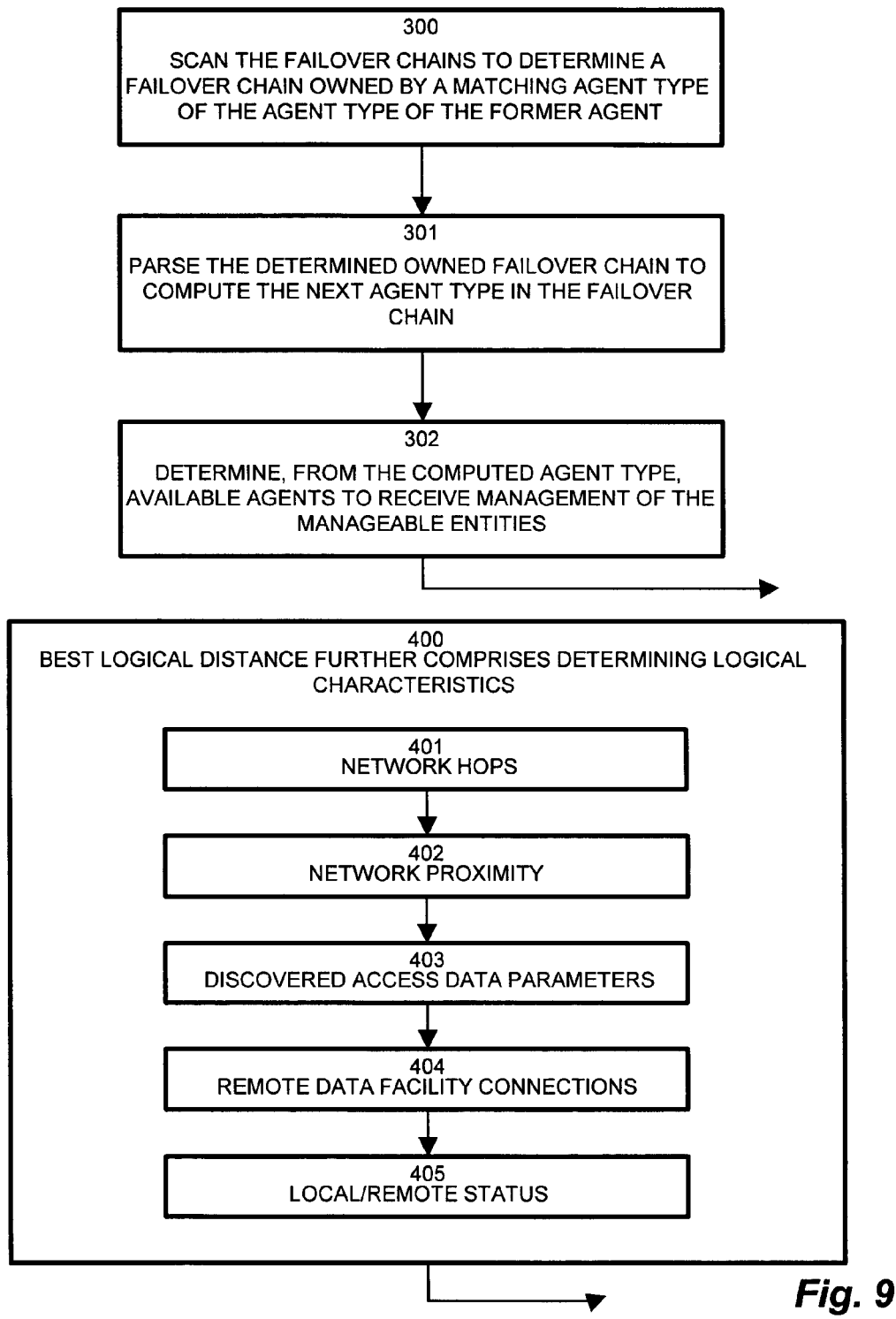
Figure 10:
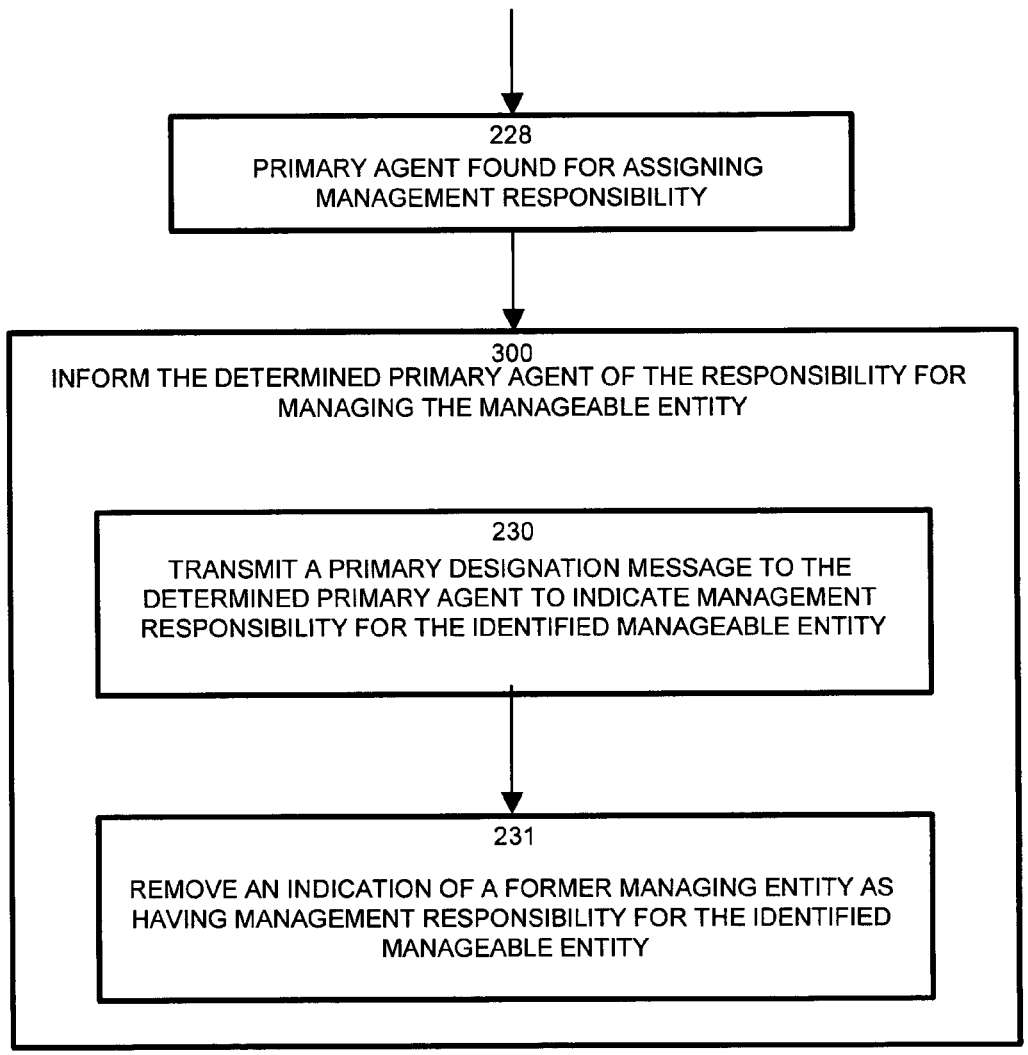

At step 101, the failover processor identifies the manageable entity type of the manageable entity requiring reassignment of management responsibility in step 100. Each manageable entity has a type, such as storage devices (i.e. disk arrays), connectivity devices, such as routers and switches, and hardware/software components, such as agents and hosts. The manageable entities 12 have associations with the types of agents 16 which may manage the entity 12. The associations are shown in FIG. 5, below, and indicate which types of agents 16 may manage a particular type of manageable entity 12. The type of the manageable entity 12, therefore, indicates which types of agents 16 may manage it. Depending on whether the manageable entity 12 is a new allocation or a reallocation, there may or may not have been a prior managing agent 16.

At step 102, the failover processor identifies a set of deployed agents 16 in the managed information network 10, each of the agents 16 having an agent type and operable to manage at least one manageable entity 12 of a particular manageable entity type. The failover processor 23 will select an agent 16 from among the available agents 16-N to manage the manageable entity 12. The database 28 lists the identity and types of each of the deployed agents in an agent configuration table 36, discussed further below At step 103, the failover processor 23 applies the failover rules 34 using the identified type of the manageable entity 12, the agent type of the managing agent 16 and the compatibility associations 35 to determine a primary agent 16 from among the identified set of deployed agents 16 for managing the manageable entity 12. The failover rules 34 define a priority of selection metrics for selecting an agent 16 to manage the manageable entity 12. The selection of the new agent is based on the agent type of the previous agent 16, in the case of a reassignment, or on a compatible agent type, in the case of a new manageable entity. In this manner, the failover rules define a precedence order of agent types which may manage entities 12 in lieu of other agent types should they become unavailable. Once determining an agent 16 type for managing the manageable entity, the failover rules 34 further specify metrics for determining the particular agent 16, discussed further below.

At step 104, the management application 22 informs the determined agent from the result of applying the failover rules that it is the primary agent 16 having responsibility for managing the manageable entity 12.

FIG. 4 is a table illustrating failover rules 34. Referring to FIG. 4, the failover processor 23 in the management application 22 applies the rules as an ordered priority. At each rule, if a single deterministic choice of agent 16 results, then that agent is selected. Otherwise, the failover processor 23 applies the next rule.

FIG. 5 is a compatibility association table 30. Referring to FIG. 5, each agent type 31-1 is associated with a manageable entity type 31-2 which it may manage. Note that a particular agent type 31-1 may manage multiple entity types 31-2. In the case of hybrid agents 16, shown by entries 30-3, 30-4, the hybrid agents (ATH), or mapper agents, may manage entity types of MET1 and MET2.

FIGS. 6–10 are a flowchart showing failover management as in FIG. 3 in greater detail. Referring to FIGS. 6–10, at step 200, a failover processor receives and defines the failover rules for designating, based on the type of the agent, failover agents types operable to manage the manageable entities corresponding to the agent type. As illustrated in the compatibility associations in the compatibility table 30 above, each type of agent 16 is adapted to manage one or more manageable entity 12 types. At step 201, the failover manager 23 examines the failover rules to ensure that the failover rules are responsive to compatibility associations between the manageable entity types and the agent types, therefore avoiding potential inconsistency in selected managing agent types.

At step 202, development and evaluation of the compatibility associations include determinations of several types of agent 16 types and the manageable entity 12 types. At steps 203–206, the compatibility associations further include designations of agent types to corresponding manageable entity types. Such designations include, at step 203, evaluating dedicated agent types, in which a dedicated agent is operable to manage a particular type of manageable entity. At step 204, hybrid, or mapper, agent types operable to manage a plurality of manageable entity types. The hybrid agent types, being compatible with several manageable entity types, may restrict operation to a subset of the operations available to a dedicated agent, in which the subset of available manageable entity operations include database and file system operations. At step 205, common interface agent types are operable to manage a manageable entity conversant in a common information model. The common information model is a non-proprietary protocol for facilitating interoperability between multiple vendors and platforms in a SAN. At step 205, lightweight agent types operable to manage manageable entities for a subset of available manageable entity operations. As with the hybrid agent types, the lightweight agents perform a selected subset of operations, and may also be a hybrid agent.

At step 207, definition of the failover rules includes identifying each agent type for which a failover is operable. The failover processor 23 enumerates the deployed agent types for which it is operable to reassign to other agents. At step 208, the failover processor defines or identifies, via operator input for example, an ordered set of rules to implement. The ordered set of rules 34 define a precedence order, or priority, in which to apply the rules to determine the type of agent to select to manage the particular manageable entity.

At step 209, for each identified agent type in step 207, the failover processor 23 determines and applies an ordered failover chain 32-N of agent 16 types compatible to manage the manageable entities 12 corresponding to the particular agent 16 type. The failover chain, in a particular configuration, is the first applied rule in the failover rules. Alternate configurations, however, may employ the failover chain as a standalone operation or a different priority sequence. The ordered failover chain 32-N, discussed below, is indicative of a priority of agent 16 types compatible with the owner agent type of the chain, in which compatibility determined by the compatibility associations 30. Therefore, the owner of a chain is a particular type of agent. Successive entries 32-N list the agent 16 types which the failover manager attempts to assign entities 12 to.

At step 210, having a definition of failover rules including the failover chain in place, the failover processor 23 is operable to apply the failover rules 34 to manageable entities 12. Accordingly the failover manager waits to detect a manageable entity requiring assignment of an agent for management responsibility of the manageable entity. At step 211, detection of a manageable entity operable for assignment is preceded by monitoring the status of existing agents, such as by polling or interrupt mechanisms as described above. The failover processor monitors for occurrences or events which trigger or indicate a need to initiate failover processing, as follows. At step 212, by detecting emergence of a new agent 16. Addition of an agent allows for load balancing by receiving management responsibility from agents which may be overloaded. At step 213, by detecting emergence of a new manageable entity. Configuration or deployment changes, such as those brought about to alleviate system bottlenecks, may result in startup of a new manageable entity. At step 214, the failover processor 23 detects failure of an existing agent, such as a network connectivity disruption. At step 215, the failover processor detects unavailability of an existing agent. Unavailability occurs from a failure to respond to a heartbeat or "ping" message sent by the management application, to which nonresponse is construed as unavailability. At step 216, the failover processor 23 detecting recovery of an existing agent after a previous designation of failure, or process termination. At step 217, the failover processor detects availability of an existing agent, which is a condition following previous unavailability, such as reconnection of a failed cable or connection.

At step 218, the failover processor identifies a manageable entity type of the manageable entity 12 requiring reassignment of management responsibility. A particular event resulting in failure of an agent 16 may result in multiple manageable entities 12 requiring reassignment. In such a scenario, the failover processor 23 applies the failover processing to each. At step 219, the failover processor identifies a set of deployed agents 12 in the managed information network 10 as candidate agents 16 for managing the particular manageable entity 12. As indicated above, each of the deployed agents 16 has an particular agent type and is therefore operable to manage manageable entities of a particular manageable entity type, according to the compatibility associations in the compatibility association table 30.

At step 220, the failover processor 23 applies the failover rules 34 using the identified type of the manageable entity 12, the agent type of the prior managing agent, if any, and the compatibility associations 30 to determine a primary agent 16 from among the identified set of candidate deployed agents 16 for managing the manageable entity 12. The prior managing agent 16 is pertinent if the assignment is in response to an currently unavailable former agent. If the assignment is a new assignment in response to addition of a manageable entity 12, then the failover processor computes the candidate agent type from the compatibility associations 30.

At step 221, the failover rules 34 specify a precedence which defines the priority order of the rules. Higher priority rules apply first, and if multiple candidate agents result from application of a higher priority rule, the next lowest priority rule applies. In the exemplary configuration shown, the precedence order applies the failover chain 32 (discussed further below with respect to FIG. 11) first, followed by the highest agent software code version, best logical distance to manageable object, according to network transmission burdens, and lowest management load.

At step 222, the failover processor 23 applies the failover chain 32, shown in FIG. 11. Referring now to steps 300–302 and FIG. 11 for failover chain processing, at step 300, the failover processor 23 scans the failover chains to determine a failover chain 32-1 . . . 32-3 owned by a matching agent type of the agent type of the former managing agent 16, or the candidate agent type if there is no former agent 16. In other words, the failover chain 32 entries specify, for a particular agent 16 type, preferences of other agent 16 types which can assume management responsibility.

At step 301, having found a chain owned by the compatible agent 16 type, the failover processor parses the determined owned failover chain to compute the next agent type in the failover chain. This selection indicates a candidate agent 16 type from which to pull a managing agent from among the deployed agents 16, and effectively eliminates other agents 16 not of this type from the candidate agent 16 group.

At step 302, the failover processor examines the deployed agents to determine, from the computed agent 16 type at step 301, available agents to receive management of the manageable entities. Returning to step 226, the failover processor 23 performs a check to determine if the determined available agents from step 302 result in a single deterministic agent. If so, then the failover processor assigns management responsibility to the determined agent, discussed below at step 228. If not, then at step 227, as each rule applies, the failover processor further applies the rules according to the precedence, in which if a rule results in multiple compatible agents operable to manage the manageable entities, applying the next rule in the precedence. Therefore, if the determination at step 226 results in a plurality of available agents, the failover processor iteratively applies the failover rules until a deterministic agent for assigning management responsibility is found. Accordingly, control reverts to step 221 for application of the next rule 223.

At step 223, the failover processor examines the software version of the candidate agents 16, and select the highest (most current) version. The current version is listed in the agent configuration table 36, (FIG. 12, below), or is obtainable by alternate suitable mechanisms.

At step 224, the failover processor 23 applies the failover rule 34 for the best logical network distance. Referring now to steps 400–405 in FIG. 8, the best logical distance test further includes determining logical characteristics which are indicative of relative distance, or the associated transmission burden, between an agent 16 and entity 12. The failover processor 23 aggregates the characteristic, including at step 401 network hops, at step 402 network proximity, at step 403 discovered access data parameters, at step 404 remote data facility connections, and at step 405 local/remote status.

The aggregated characteristics result in a logical distance score for each agent 16. In a particular configuration, the discovered access parameters computed at step 403 include assessing the robustness of a set of access data parameters which an agent 16 has for managing an entity. The access data parameters enable an agent greater management capability of an entity 12. Therefore, a more robust set of access data parameters qualifies a particular agent as a better candidate. Further details on the dissemination and capabilities of such access data parameters are discussed in copending U.S. patent application Ser. No. 10/675,281 entitled "SYSTEM AND METHOD FOR ASSIGNING MANAGEMENT RESPONSIBILITY FOR MANAGEABLE ENTITIES," filed Sep. 30, 2003, assigned to EMC corporation of Hopkinton, Mass., assignee of the present application, and incorporated herein by reference.

In a particular implementation, at step 404 remote data facility connections include a proprietary connection mechanism for interconnecting elements in a SAN. Such an exemplary mechanism is the Symmetrix Remote Data Facility (SRDF), marketed commercially by EMC corporation of Hopkinton, Mass., assignee of the present application.

At step 225, the failover processor examines the management load of the candidate agents to determine agents 16 managing fewer entities 12. Lesser loaded agents 16 are a more optimal selection for management responsibility and therefore provide a load balancing capability.

At step 228, after application of the failover rules 34, a determined managing, or primary agent 16 results. At step 229, the failover processor informs the determined primary agent 16 of the responsibility for managing the manageable entity 12. At step 230, the failover processor 23 transmits a primary designation message to the determined primary agent 16 to indicate management responsibility for the identified manageable entity 12. At step 231, the assignment may also involve removing an indication of a former managing agent 16 as having management responsibility for the identified manageable entity 12, such as sending an appropriate message or updating the configuration table 36.

FIG. 11 is an exemplary set, or file, of failover chains. Referring to FIG. 11, the failover chains 32-1 . . . 32-3 indicate a prioritized selection of the type of management agent 16 based on the type of the agent 16 formerly managing the entity 12, or, if there was not a former managing agent, based on a preferred agent 16 type according to the association table.

Figure 13:
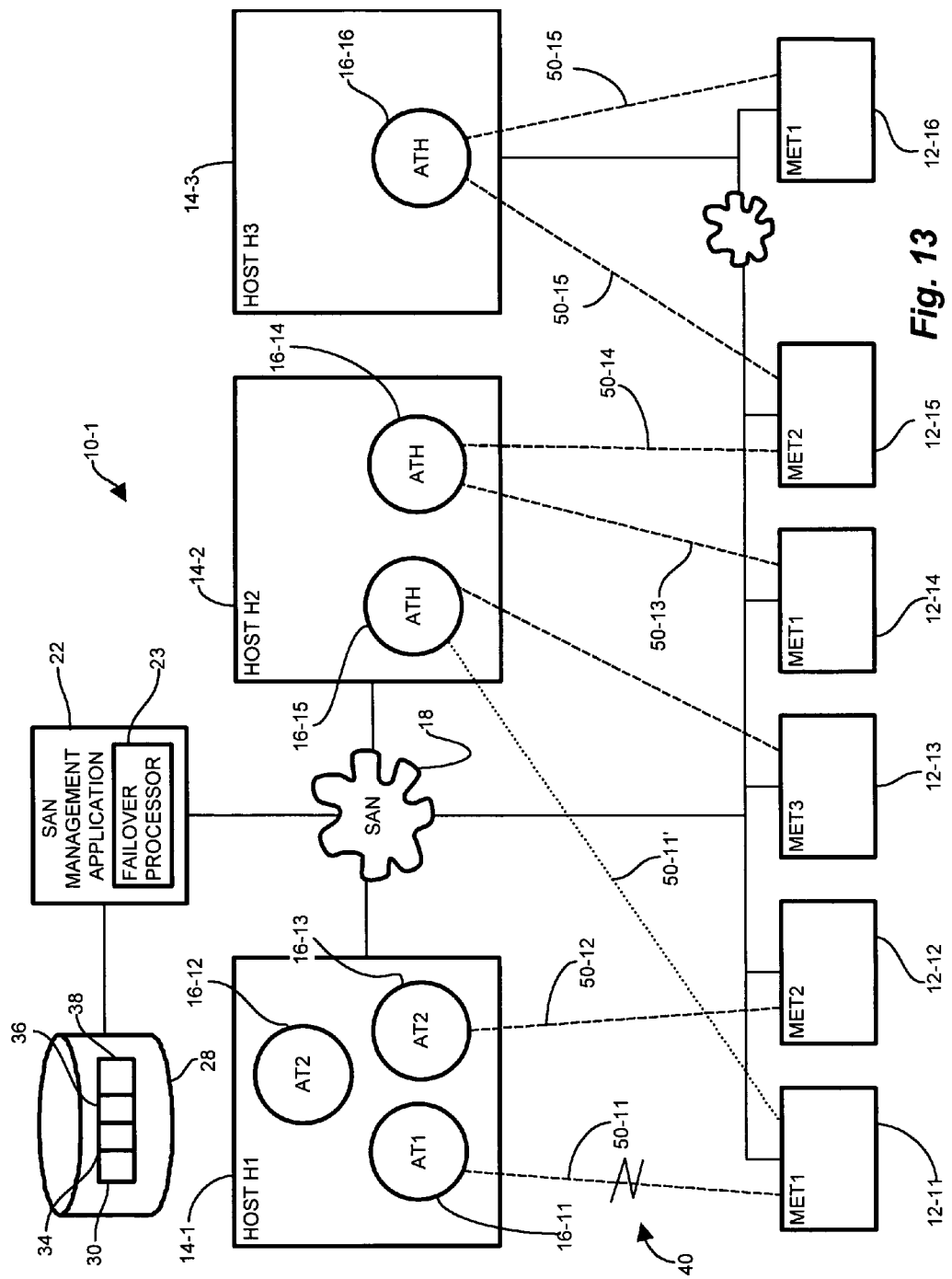
FIG. 13 is an example application of the failover rules and failover chains in the computer system of FIG. 3.

FIGS. 12 and 13 are an example of applying the failover rules 34 and failover chains 32 on the computer system 10 of FIG. 3, illustrating an exemplary computation of failover metrics in a particular configuration of the invention. Referring to FIGS. 11, 12 and 13, the exemplary network 10-1 now includes hosts 14-11 . . . 14-13, agents 16-11 . . . 16-16, and manageable entities 12-11 . . . 12-16. The failover chain 32, stored in the SAN database 28, includes entries 32-1 . . . 32-3 for each of the agent types in the exemplary network 10-1. The failover rules 34, also stored in the SAN database 28 include entries 34-1 . . . 34-4, also shown as above. Current agent status is shown in the agent configuration table 36, which has an entry 36-1 . . . 36-6 for each deployed agent. Briefly, the agent configuration table 36 includes entries (columns) for agent ID 38-1, agent type 38-2, agent software version 38-3, agent load 38-4, and agent availability 38-5.

In the exemplary operational scenario discussed below, agent 16-1 experiences network link failure, shown by arrow 30, such as a pulled or pinched line. Accordingly, agent 16-11 is rendered unavailable, as shown by agent configuration entry 36-1 at column 38-5. Accordingly, manageable entity 12-11 is without a managing agent 16. Applying the failover rules from the failover rules table 34 triggers rule 34-1 to invoke the failover chain 32.

To apply the failover chain 32, the management application first determines the manageable entity type from the agent configuration table 36. Referring to entry 36-1 of the agent configuration table 36, the agent type is ATI, as shown in column 38-2. Applying the failover chain 32, a match is found for ATI at entry 32-2. Following the failover chain in entry 32-2, the first entry 33-1 is for an agent type ATI. The management application 22 scans the available agents in column 38-2 of the configuration table 36, and finds no other agents of type ATI.

Accordingly, failover processing advances to the next item in the failover chain at column 33-2 to determine a candidate agent type of ATH. Therefore, the failover processor 23 scans the configuration table for agent types 38-2 matching ATH, or hybrid agents. The failover processor 23 finds three agents 16-14, 16-15 and 16-16 in entries 36-4, 36-5 and 36-6, respectively, as candidate ATH agents. Since rule 1 34-1 yields multiple candidate agents, the failover processor 23 advances to the next rule 34-2. Failover rule 34-2 looks to the candidate agents version in column 38-3, and determines that each has version 3.1. Accordingly, the version test also evaluates to multiple candidate agents 16-4, 16-15 and 16-16.

Applying rule 34-3, the failover processor looks to logical network distance to compute a managing agent 16. Agent 16-6 is located on a remote agent 14-3, as shown by SAN link 42. According, the failover processor computes two (2) hops from the agent 16-16 to the manageable entity 12-11. Agents 16-4 and 16-5 execute on host 16-12, and accordingly, are each computed to be one (1) hop away. Therefore, the failover processor eliminates agent 16-6 as a candidate agent. However, multiple agents 16-4 and 16-5 remain as candidate agents.

The failover processor 23 then applies rule 34-4 to assess the relative load of the remaining candidate agents. As shown in the configuration, agent 16-14 manages entities 12-14 and 12-15, also denoted in the configuration table 36 and entry 36-4, column 38-4. However, agent 16-15 only manages entity 12-14, also shown by configuration table 36 entry 36-5. Accordingly, agent 16-15 has a lighter load than agent 16-14 and accordingly, the failover processor 23 selects agent 16-15 to manage entity 12-1, as shown by dotted line 50-16.

The managed information system disclosed herein may encompass a variety of alternate deployment environments. In a particular configuration, the exemplary SAN management application discussed may be the EMC Control Center application (ECC), marketed commercially by EMC corporation of Hopkinton, Mass., assignee of the present application.

Those skilled in the art should readily appreciate that the programs and methods for failover management of manageable entity agents in a storage area network as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for failover management of manageable entity gents in a storage area in a storage area network has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for allocating and reallocating management responsibility of manageable entities to agents in a managed information network comprising:

detecting a manageable entity requiring assignment of an agent for management responsibility of the manageable entity;

identifying a manageable entity type of the manageable entity requiring reassignment of management responsibility;

identifying a set of deployed agents in the managed information network, each of the agents having an agent type and operable to manage at least one manageable entity of a particular manageable entity type;

defining failover rules, the failover rules for designating, based on the type of the agent, failover agents types operable to manage the manageable entities corresponding to the agent type, the failover rules further responsive to compatibility associations between the manageable entity types and the agent types, further comprising:

defining an ordered set of rules, the ordered set of rules following a precedence, the precedence defining a priority order comprising: 1) failover chain, 2) highest agent version, 3) best logical distance to manageable object, and 4) lowest management load;

applying the failover rules using the identified type of the manageable entity, the agent type of the managing agent and the compatibility associations to determine a primary agent from among the identified set of deployed agents for managing the manageable entity; and sending a message to the determined primary agent to inform the determined primary agent of the responsibility for managing the manageable entity.

2. The method of claim 1 wherein defining the failover rules further comprises:

identifying each agent type for which a failover is operable; and for each identified agent type, defining an ordered failover chain of agent types compatible to manage the manageable entities corresponding to the identified agent type, the ordered failover indicative of a priority of agent types, and compatibility determined by the compatibility associations.

3. The method of claim 1 further comprising applying the failover rules by applying the rules according to the precedence, wherein if a rule results in multiple compatible agents operable to manage the manageable entities, applying the next rule in the precedence.

4. The method of claim 1 wherein best logical distance further comprises determining logical characteristics including at least one of network hops, network proximity, discovered access data parameters, remote data facility connections, and local/remote status.

5. The method of claim 1 wherein applying the failover chain further comprises:

identifying manageable objects operable to be reallocated to another agent from a former agent;

scanning the failover chains to determine a failover chain owned by a matching agent type of the agent type of the former agent;

parsing the determined owned failover chain to compute the next agent type in the failover chain; and determining, from the computed agent type, available agents to receive management of the manageable entities.

6. The method of claim 5 further comprising:

if the determining available agents results in a deterministic agent, assigning management responsibility to the determined agent; and if the determining results in a plurality of available agents, iteratively applying the failover rules until a deterministic agent for assigning management responsibility is found.

7. The method of claim 1 wherein detecting a manageable entity operable for assignment is preceded by steps comprising:

monitoring the status of existing agents; and at least one of;

detecting emergence of a new agent;

detecting emergence of a new manageable entity;

detecting failure of an existing agent;

detecting unavailability of an existing agent;

detecting recovery of an existing agent; and detecting availability of an existing agent.

8. The method of claim 1 wherein informing further comprises:

transmitting a primary designation message to the determined primary agent to indicate management responsibility for the identified manageable entity; and removing an indication of a former managing entity as having management responsibility for the identified manageable entity.

9. The method of claim 8 wherein the subset of available manageable entity operations include database and file system operations.

10. The method of claim 1 wherein the agent types further include a hybrid agent operable to manage manageable entities of a plurality of manageable entity types.

11. The method of claim 1 wherein the compatibility associations further include designations of agent types to corresponding manageable entity types, the designations further comprising:

dedicated agent types, wherein a dedicated agent is operable to manage a particular type of manageable entity;

hybrid agent types, wherein a hybrid agent is operable to manage a plurality of manageable entity types;

common interface agent types, wherein a common interface agent is operable to manage a manageable entity conversant in a common information model; and lightweight agent types, wherein a lightweight agent is operable to manage manageable entities for a subset of available manageable entity operations.

12. A network management server having a network management application for allocating and reallocating management responsibility of manageable entities to agents in a managed information network comprising:

a failover processor;

a memory;

an interface operable to communicate with agents, manageable entities, and network elements, the failover processor operable to detect a manageable entity requiring assignment of an agent for management responsibility of the manageable entity;

a compatibility association table for identifying a manageable entity type of the manageable entity requiring reassignment of management responsibility;

an agent configuration table operable to store information to identify a set of deployed agents in the managed information network, each of the agents having an agent type and operable to manage at least one manageable entity of a particular manageable entity type;

a set of failover rules, the failover processor operable to apply the failover rules using the identified type of the manageable entity, the agent type of the managing agent and the compatibility associations to determine a primary agent from among the identified set of deployed agents for managing the manageable entity, the failover processor further operable to inform the determined primary agent of the responsibility for managing the manageable entity, the failover rules further adapted to designate, based on the type of the agent, failover agents types operable to manage the manageable entities corresponding to the agent type, the failover rules responsive to compatibility associations between the manageable entity types and the agent types; the failover processor further operable to:

transmit a primary designation message to the determined primary agent to indicate management responsibility for the identified manageable entity; and remove an indication of a former managing entity as having management responsibility for the identified manageable entity.

13. The network management server of claim 12 wherein the failover processor is further operable to:

identify each agent type for which a failover is operable; and for each identified agent type, process an ordered failover chain of agent types compatible to manage the manageable entities corresponding to the identified agent type, the ordered failover indicative of a priority of agent types, and compatibility determined by the compatibility associations.

14. The network management server of claim 13 wherein the failover processor is further operable to apply the rules according to a precedence order defined by the priority comprising: 1) failover chain, 2) highest agent version, 3) best logical distance to manageable object, and 4) lowest management load, wherein if applying a rule results in multiple compatible agents operable to manage the manageable entities, applying the next rule in the priority.

15. The network management server of claim 14 wherein the failover processor is operable to compute the best logical distance by determining logical characteristics including at least one of network hops, network proximity, discovered access data parameters, remote data facility connections, and local/remote status.

16. The network management server of claim 14 wherein the failover processor is further operable to:

identify manageable objects operable to be reallocated to another agent from a former agent;

scan the failover chains to determine a failover chain owned by a matching agent type of the agent type of the former agent;

parse the determined owned failover chain to compute the next agent type in the failover chain; and determine, from the computed agent type, available agents to receive management of the manageable entities.

17. The network management server of claim 16 wherein the failover processor is further selectively operable to:

if determining available agents results in a deterministic agent, assign management responsibility to the determined agent; and if determining results in a plurality of available agents, iteratively apply the failover rules until a deterministic agent for assigning management responsibility is found.

18. The network management server of claim 12 wherein the failover processor is operable to:

monitor the status of existing agents; and at least one of detect emergence of a new agent;

detect emergence of a new manageable entity;

detect failure of an existing agent;

detect unavailability of an existing agent;

detect recovery of an existing agent; and detect availability of an existing agent.

19. The network management server of claim 12 wherein compatibility association table is indicative of agent types corresponding manageable entity types, the agents further comprising:

dedicated agent types, wherein a dedicated agent is operable to manage a particular type of manageable entity;

hybrid agent types, wherein a hybrid agent is operable to manage a plurality of manageable entity types;

common interface agent types, wherein a common interface agent is operable to manage a manageable entity conversant in a common information model; and lightweight agent types, wherein a lightweight agent is operable to manage manageable entities for a subset of available manageable entity operations.

20. A computer program product having a computer readable medium operable to store computer program logic embodied in computer program code encoded thereon for allocating and reallocating management responsibility of manageable entities to agents in a managed information network comprising:

computer program code for detecting a manageable entity requiring assignment of an agent for management responsibility of the manageable entity;

computer program code for identifying a manageable entity type of the manageable entity requiring reassignment of management responsibility;

computer program code for identifying a set of deployed agents in the managed information network, each of the agents having an agent type and operable to manage at least one manageable entity of a particular manageable entity type;

computer program code for applying failover rules using the identified type of the manageable entity, the agent type of the managing agent and the compatibility associations to determine a primary agent from among the identified set of deployed agents for managing the manageable entity; and computer program code for sending a message to the determined primary agent to inform the determined primary agent of the responsibility for managing the manageable entity, informing further comprising:

transmitting a primary designation message to the determined primary agent to indicate management responsibility for the identified manageable entity; and removing an indication of a former managing entity as having management responsibility for the identified manageable entity.

21. An encoded set of processor based instructions including program code stored on a computer readable medium embodying program logic for directing a processor responsive to the instructions to perform steps for allocating and reallocating management responsibility of manageable entities to agents in a managed information network comprising: program code for detecting a manageable entity requiring assignment of an agent for management responsibility of the manageable entity; program code for identifying a manageable entity type of the manageable entity requiring reassignment of management responsibility; program code for identifying a set of deployed agents in the managed information network, each of the agents having an agent type and operable to manage at least one manageable entity of a particular manageable entity type; program code for applying failover rules using the identified type of the manageable entity, the agent type of the managing agent and the compatibility associations to determine a primary agent from among the identified set of deployed agents for managing the manageable entity, further including applying the rules according to a precedence order defined by the priority comprising: 1) failover chain, 2) highest agent version, 3) best logical distance to manageable object, and 4) lowest management load, wherein if applying a rule results in multiple compatible agents operable to manage the manageable entities, applying the next rule in the priority; and program code for sending a message to the determined primary agent to inform the determined primary agent of the responsibility for managing the manageable entity, the program code for identifying a manageable entity type further operable to: identify each agent type for which a failover is operable; and for each identified agent type, process an ordered failover chain of agent types compatible to manage the manageable entities corresponding to the identified agent type, the ordered failover indicative of a priority of agent types, and compatibility determined by the compatibility associations.

22. A network management server having a network management application for allocating and reallocating management responsibility of manageable entities to agents in a managed information network comprising:

means for detecting a manageable entity requiring assignment of an agent for management responsibility of the manageable entity;

means for identifying a manageable entity type of the manageable entity requiring reassignment of management responsibility, further comprising a compatibility association table indicative of agent types corresponding manageable entity types, the agents further comprising:

dedicated agent types, wherein a dedicated agent is operable to manage a particular type of manageable entity;

hybrid agent types, wherein a hybrid agent is operable to manage a plurality of manageable entity types;

common interface agent types, wherein a common interface agent is operable to manage a manageable entity conversant in a common information model; and lightweight agent types, wherein a lightweight agent is operable to manage manageable entities for a subset of available manageable entity operations;

means for identifying a set of deployed agents in the managed information network, each of the agents having an agent type and operable to manage at least one manageable entity of a particular manageable entity type;

means for applying failover rules using the identified type of the manageable entity, the agent type of the managing agent and the compatibility associations to determine a primary agent from among the identified set of deployed agents for managing the manageable entity; and means for sending a message to the determined primary agent to inform the determined primary agent of the responsibility for managing the manageable entity.

* * * * *